US011189824B2

(12) United States Patent
Ebner et al.

(10) Patent No.: US 11,189,824 B2
(45) Date of Patent: Nov. 30, 2021

(54) METHOD AND APPARATUS FOR APPLYING MAGNETIC FIELDS TO AN ARTICLE (71) Applicant: Battrion AG, Lucerne (CH)

(72) Inventors: Martin Ebner, Zurich (CH); Felix Geldmacher, Zurich (CH); Max Kory, Zurich (CH); Deniz Bozyigit, Zurich (CH)

(*) Notice: Subject to any disclaimer, the term of this patent is extended or adjusted under 35 U.S.C. 154(b) by 0 days.

(21) Appl. No.: 16/327,116

(22) PCT Filed: Sep. 5, 2017

(86) PCT No.: PCT/IB2017/055317
§ 371 (c)(1),
(2) Date: Mar. 4, 2019

(87) PCT Pub. No.: WO2018/047054
PCT Pub. Date: Mar. 15, 2018

(65) Prior Publication Data
US 2019/0190010 A1  Jun. 20, 2019

(30) Foreign Application Priority Data

Sep. 6, 2016 (CH) .................................... 01147/16
Feb. 13, 2017 (CH) .................................... 00165/17

(51) Int. Cl.
*H01M 4/1393* (2010.01)
*H01M 4/04* (2006.01)
*H01M 4/62* (2006.01)
*H01M 10/0525* (2010.01)
*H01F 13/00* (2006.01)
*H01M 4/587* (2010.01)
*H01M 4/133* (2010.01)
*H01M 4/583* (2010.01)
*C25B 11/043* (2021.01)
*H01F 7/02* (2006.01)
*H01F 41/16* (2006.01)

(52) U.S. Cl.
CPC ........ *H01M 4/1393* (2013.01); *H01F 7/0294* (2013.01); *H01F 13/003* (2013.01); *H01F 41/16* (2013.01); *H01M 4/0409* (2013.01); *H01M 4/0471* (2013.01); *H01M 4/133* (2013.01); *H01M 4/583* (2013.01); *H01M 4/587* (2013.01); *H01M 4/622* (2013.01); *H01M 10/0525* (2013.01); *C25B 11/043* (2021.01)

(58) Field of Classification Search
None
See application file for complete search history.

(56) References Cited

U.S. PATENT DOCUMENTS

| 7,060,387 | B2 | 6/2006 | Kim et al. |
| 7,326,497 | B2 | 2/2008 | Matsubara et al. |
| 7,459,235 | B2 | 12/2008 | Choi et al. |
| 7,976,984 | B2 | 7/2011 | Tokuoka et al. |
| 8,518,584 | B2 | 8/2013 | Kawamoto et al. |
| 8,865,270 | B2 | 10/2014 | Mikami et al. |
| 8,889,761 | B2 | 11/2014 | Studart et al. |
| 9,490,476 | B2 | 11/2016 | Mitsuhashi et al. |
| 9,673,453 | B2 | 6/2017 | Uchida et al. |
| 10,374,214 | B2 | 8/2019 | Wood et al. |
| 2001/0036565 | A1 | 11/2001 | Jennings |
| 2004/0072076 | A1 | 4/2004 | Matsubara et al. |
| 2008/0248306 | A1 | 10/2008 | Spillmann et al. |
| 2011/0135836 | A1 | 6/2011 | Hays et al. |
| 2012/0088148 | A1 | 4/2012 | Leddy et al. |
| 2012/0177842 | A1 | 7/2012 | Mikami et al. |
| 2013/0255074 | A1* | 10/2013 | Uchida ................. H01M 4/139 29/623.5 |
| 2014/0065478 | A1 | 3/2014 | Mitsuhashi et al. |
| 2014/0072848 | A1 | 3/2014 | Hagiwara |
| 2015/0030931 | A1 | 1/2015 | Takahata et al. |
| 2016/0093872 | A1 | 3/2016 | Wood et al. |
| 2017/0305184 | A1 | 10/2017 | Muller |

FOREIGN PATENT DOCUMENTS

| EP | 2009044 A1 | 12/2008 |
| EP | 2793300 A1 | 10/2014 |
| EP | 2987192 B2 | 1/2019 |
| JP | 3443227 B2 | 9/2003 |
| JP | 2004-016858 A | 1/2004 |
| JP | 2004-220926 A | 8/2004 |

(Continued)

OTHER PUBLICATIONS

ISR and written opinion, dated Nov. 21, 2017, from parent International appl. PCT/IB2017/055317 published as WO2018/047054A1, with English translation of ISR.
Tjaden, B. et al. "Tortuosity in Electrochemical Devices: A Review of Calculation Approaches," International Materials Reviews, 63:2, 47-67, (2018) DOI: 10.1080/09506608.2016.1249995.
Agubra, V. et al. "Lithium Ion Battery Anode Aging Mechanisms," Materials, 6, 1310-1325 (2013) DOI: 10.3390/ma6041310.
K. Halbach, "Design of Permanent Multipole Magnets With Oriented Rare Earth Cobalt Material," Nuclear Instruments and Methods, v.169, Issue 1; Feb. 1, 1980; pp. 1-10. DOI: 10.1016/0029-554X(80)90094-4.
Kehrwald, D; Shearing, P.R.; Brandon, NP; Sinha, P.K.; Harris, S.J.; "Local Tortuosity Inhomogeneities in a Lithium Battery Composite Electrode," Journal of the Electrochemical Society (2011), 158 (12) A1393-A1399. DOI: 10.1149/2.079112jes.

(Continued)

Primary Examiner — Ladan Mohaddes
(74) Attorney, Agent, or Firm — George Kapsalas (57) ABSTRACT Processes for applying magnetic fields to articles such as a layer or layer-coated articles, and more particularly to coatings having graphite particles, preferably for manufacture of negative electrodes having aligned graphite particles, for example for fast-charging lithium-ion batteries. The application of magnetic fields may be continuous. For this, magnetic tools with permanent magnets may be used for applying magnetic fields, wherein an article is moved relative to a magnetic tool. Application of magnetic field is made before the initiation of a drying phase and/or during a drying phase.

10 Claims, 9 Drawing Sheets (56) References Cited

FOREIGN PATENT DOCUMENTS

| JP | 2009-193932 A | 8/2009 |
|---|---|---|
| JP | 2012-251171 A | 12/2012 |
| KR | 2003-0052950 A | 6/2003 |
| WO | 2009/126442 A1 | 10/2009 |
| WO | 2011/120643 A2 | 10/2011 |
| WO | 2012/124033 A1 | 9/2012 |
| WO | 2013/067280 A1 | 5/2013 |
| WO | 2014/097309 A1 | 6/2014 |
| WO | 2014/170024 A1 | 10/2014 |
| WO | 2016/083259 A1 | 6/2016 |

OTHER PUBLICATIONS

Erb, Randall M.; Libanori, Rafael; Rothfuchs, Nuria; Studart, Andre R. "Composites Reinforced in Three Dimensions by Using Low Magnetic Fields," Science, Jan. 13, 2012; v.335(6065):199-204. DOI: 10.1126/science.1210822.
English translation of the PCT/ISA Written Opinion of Nov. 21, 2017, 7 pages, form PCT/ISA/237 from parent International appl. PCT/IB2017/055317 published as WO2018/047054A1.
Lim, S., Ahn K.H. & Yamamura, M, "Latex Migration in Battery Slurries During Drying," in Langmuir—the ACS Journal of fundamental interface Science; American Chemical Society: Print Edition ISSN: 0743-7463, Web ISSN: 1520-5827; vol. 29, No. 26, pp. 8233-8244; DOI: 10.1021/la4013685; Date Jun. 7, 2013.
Copending U.S. Appl. No. 19/968,667, filed (in PCT) Feb. 11, 2019.

* cited by examiner

METHOD AND APPARATUS FOR APPLYING MAGNETIC FIELDS TO AN ARTICLE

This application is a 35 U.S.C. 371 national-phase entry of PCT International application no. PCT/IB2017/055317 filed on Sep. 5, 2017 and also claims benefit of priority to both of prior Swiss national applications no. CH 00165/17 filed on Feb. 13, 2017 and no. CH 01147/16 filed on Sep. 6, 2016, and parent PCT International application no. PCT/IB2017/055317 is integral, in its entirety for all intents and purposes, with the present U.S. application.

BACKGROUND

The present disclosure relates to a method for applying magnetic fields to an article with the aid of a magnetic tool, wherein the application of the magnetic fields occurs in particular continuously and in particular upon a graphite coating, and further especially for the manufacture of an article in the form of a negative electrode with vertically aligned graphite particles, for example for lithium-ion batteries with fast charging capacity and/or higher energy density. The present disclosure furthermore relates to a negative electrode manufactured by the method according to the disclosure and having vertically aligned graphite particles.

Carbon-based materials, in particular graphite, find application as active material in battery electrodes, especially negative electrodes. Graphite has a layer-like structure consisting of individual carbon layers that can intercalate ions, for example lithium ions in a lithium-ion battery. Graphite's layered structure is reflected in its occurrence in plate-like flake form.

With the use of flaky/flake-form graphite as the active material in an electrode, the flake-shaped graphite particles typically come to lie parallel (horizontally) to an underlying current collector foil. This leads to convoluted or labyrinthine pore passages through the electrode. The lithium ions that diffuse from the positive electrode into the negative and vice versa must pass through this tortuous pore path. Particularly in the case of high charge rates, the lithium ions cannot move sufficiently fast through the pore passageways, and this can lead to a diminution of usable storage capacity. By aligning the graphite particles, the path lengths that the lithium ions cover during charging and discharging can be shortened, and the charging and discharging properties of an electrochemical storage can be improved.

For the industrial manufacture of negative graphite electrodes, the flaky graphite is frequently rounded off. However, up to 70% of the original material gets lost in the mechanical rounding process.

The idea of utilizing flake-form graphite and greatly reducing the tortuous pore paths by alignment of the graphite flakes perpendicular to the current collector sheet, thereby achieving higher charge and discharge rates of the battery, is known and was first disclosed in patent JP3443227B2. It is known to obtain this alignment by a magnetic field. However, particularly due to high magnetic fields and low packing densities, the practical implementation of this technology has so far been incompatible with cost-efficient, continuous production processes.

Publication EP2793300A1 discloses an application for the manufacture of electrodes, wherein magnetic nanoparticles are applied to electrochemically active particles, which in turn are coated as slurry (suspension or paste) on a substrate, and then a magnetic field is applied to the particles. Although in the production of the graphite paste the addition of magnetic nanoparticles, leading to the enhancement of the graphite particles with nanoparticles, can indeed increase the magnetic responsiveness of the graphite particles, it can however complicate the process. The addition of magnetic nanoparticles can also result in undesirable electrochemical processes that may have undesired effects on the final product. No method for any particular continuous production process using continuous application of magnetic fields is disclosed.

U.S. Pat. No. 7,326,497B2 describes a negative electrode and its manufacture for application in a rechargeable lithium-ion battery. A method is disclosed by which the graphite covering is aligned between two magnets in a magnetic field having a flux density greater than 0.5 T. The alignment of the graphite particles in the coating is based on the diamagnetic anisotropy of graphite. The diamagnetic susceptibility perpendicular to the (002)-plane of the graphite is approximately 40-50 times as large as the diamagnetic susceptibility perpendicular to the (110)-plane. In order to obtain good vertical orientations, flux densities of over 1 T, or rather even 2.3 T, are proposed. Flux densities in this range are technically difficult to implement, so, for example, superconducting magnets are required for such high flux density.

Another patent, U.S. Pat. No. 7,976,984B2 describes a rechargeable battery in which mechanically rounded graphite particles are aligned to a magnetic field. Through the orientation of the rounded graphite particles in a magnetic field, the path length of lithium ions can indeed be slightly shortened, and thereby the charging and discharging properties are improved. This improvement effect is further enhanced by the use of flaky graphite. Still, as previously mentioned, up to 70% of the original material gets lost in the rounding process.

When graphite is aligned in a uniform magnetic field as described in U.S. Pat. Nos. 7,976,984B and 7,326,497B2, then particles are aligned in such a way that the layers of graphite come to lie parallel to the magnetic field. For asymmetric, for example flake-form graphite particles, that means vertical to their longest axis. With nearly spherical particles, the effect on the packing characteristic is slight, but, for non-spherical particles, this leads to a disadvantageous packing characteristic by which the individual graphite particles stand in a random order along their second-longest axis. This results in low particle packing densities.

SUMMARY

The primary object of the present disclosure is therefore to develop a method for application of magnetic fields, in particular for the continuous application of magnetic fields to an article that is in particular a layer or an article coated with a layer, more particularly to a graphite coating for manufacture of an article in the form of a negative electrode.

Continuous is in this context defined in the sense of meaning "in a continuous production process" such as "roll-to-roll processing," and not as "constant" or "incessant."

The article, which may be merely a single layer, may, for example, include graphite particles, a binder, and a constituent volatilized by drying. At the same time, the graphite particles may be of natural or synthetic origin and may include all particle shapes.

The object is achieved within the scope of the present disclosure.

In the method according to the present disclosure, a magnetic field is applied in particular to a layer or to a layer-coated article, in particular during manufacturing and/or processing of the article. To this end, the article is exposed to a changing magnetic field.

A magnetic tool that includes an arrangement of at least one permanent magnet is utilized to apply magnetic fields.

The present disclosure further relates to an inventive tool and a manufactured electrode.

For application in batteries with high energy density, the previously described packing density of the active material graphite is of crucial importance. The present disclosure solves this problem, as it aligns the graphite particles not only along one direction but rather along two directions.

It is an aim of the method according to the present disclosure to enable a particular continuous application of magnetic fields, for example during a manufacturing and/or processing method of negative electrodes with vertically aligned graphite particles, for, by way of example, fast-charging lithium-ion batteries.

At the beginning of the method, the components, for example graphite particles in a coating, are movable and are aligned by the action of a changing magnetic field of a magnetic tool according to the present disclosure according to two preferred directions. Both of these preferred directions are defined by the configuration of the magnetic tool and the relative direction of movement of article and tool. During or after this alignment of the components with the aid of the magnetic tool, the components must be immobilized for the method's completion, in order to lock in the alignment.

The immobilization of the aligned components may take place, for example, by drying. A drying is characterized in that a volatile constituent contained in the coating leaves the coating. This volatile constituent is water in the case of water-based graphite pastes. The drying leads to the immobilization of the vertically aligned components. The drying may be both passive, for example due to the ambient temperature, meaning not assisted; as well as active, meaning through systematic drying, for example with a blower. Alternatively, the immobilization of the components of the layer/coating may also take place by systematic solidification/gelling of the moist layer/coating. A method of solidifying/gelling the moist layer/coating, for example by using a thermoresponsive constituent as part of the layer/coating, is disclosed as part of this disclosure.

An example is illustrated in following using the example of a graphite coating for the production of lithium-ion battery.

The drying process by which the volatile constituent is removed can lead to the aligned graphite particles losing their orientation. Especially the air drying in the oven by blowers can have a significant effect on the orientation of the aligned particles. More particularly, the graphite particles' alignment achieved by the magnetic tool may be lost during drying. In turn, this loss of alignment of the graphite particles may limit the electrochemical performance of the electrode during charging and discharging.

Solution Variant A:

A solution preserves the alignment of the graphite particles during drying also. The magnetic tool described herein is also employed during drying in order to ensure the alignment of the graphite particles during drying. Thus, the aligned graphite particles remain aligned also during drying.

Solution Variant B:

In the context of the present disclosure, this problem may also be solved by the use of a solidifying/gelling constituent, such as a thermoresponsive constituent that is included in the paste to be coated. This constituent, by way of example methylcellulose, under the effect of heat causes the coated moist coating/layer to solidify without at the same time removing the volatile component. The LCST, the lower critical solution temperature, plays an important role here. A LCST is often observed when polymers such as methylcellulose, hydroxypropylcellulose containing substituted and unsubstituted anhydroglucose rings, or even polymers such as Poly(N-Isopropylacrylamide) are components of the mixtures. In this case, a transition of the polymer chains from an open-chain cluster conformation to a compact globular conformation can be observed. Above the LCST there exists a miscibility gap that can lead to the solidification of the coating/layer. The heating required to reach above the LCST can take place, for example, through a heated blower, heated rollers or an IR-heater. Even small mass fractions of the thermoresponsive component such as 0.25% by weight in the layer to be coated (equivalent to 0.5% by weight in the resulting dried coating at a solids content of 50% by weight of the layer to be coated) are adequate, with temperature rise above the LCST, to bring about the solidification of the paste.

The paste's solidification brought about by the thermoresponsive constituents fixes the graphite particles, so that the alignment that was previously obtained via the magnetic tool's magnetic field is preserved long-term. This allows the subsequent drying to be executed without application of a magnetic field, since movement within the coating, for example by convection, is prevented; and the constituents, for example graphite particles, cannot change their orientation. This permits to reduce the required quantity of magnets needed to retain vertical alignment. This is, then, particularly advantageous if in this manner it is possible to dispense with the installation of expensive high-temperature-resistant magnets in the dryer.

For the manufacture of durable rechargeable lithium-ion batteries, the adhesion of the coating to a current collector, preferably a current collector foil such as for example a copper foil, plays a special role. For electrodes that have low adhesion, the active material coating, for example graphite of current collector foil, may over time detach or delaminate due to stresses at the interface. Especially the graphite particles' expansion and contraction that takes place during the battery's charging and discharging sequence can lead to this. This can result in a diminution in the charge and discharge capacity of the battery. Possible causes for low adhesion in water-based, negative graphite electrodes lie in (a) the migration of SBR (styrene-butadiene rubber) binder particles during the drying procedure, and (b) a small contact area between graphite particles and the current collector foil.

The alignment of the graphite particles in the fluid paste in the manufacture of water-based graphite electrodes, and the associated shortened paths, can lead to increased binder migration at drying. With that, removal of the SBR binder particles from the interface between coating and current collector foil can increase, which in turn can lead to a poor adhesion.

In addition, the vertical alignment of the graphite particles on the current collector foil during the charging and discharging sequence and the concomitant expansion and contraction of the graphite particles can lead to increased formation of stresses at the interface between the coating and the current collector foil. The vertical arrangement of the graphite particles means that, when charging the battery, the expansion of the graphite particles takes place in the same direction. With that, graphite particles that stand side by side can displace one another. With the passage of time, the associated stresses may lead to a decrease of the adhesion of the coating onto the current collector foil.

Solutions towards an improved adhesion between coating and current collector foil are disclosed herein.

Solution Variant A:

In order to reduce the stresses which may arise during expansion and contraction of the aligned graphite particles and during charging and discharging of the battery, the angle of inclination of the graphite particles relative to the current collector film may be adjusted via the operation of the appropriate magnetic tool during the manufacturing process. With that, the angle of inclination of the graphite particles preferably lies between 45° and 85°. In this manner, a significant portion of the expansion of the graphite particles may take place in the direction off the current collector foil, so that less stress builds up between the graphite coating and the current collector foil, and thereby the adhesion to the current collector foil is increased.

Solution Variant B:

Furthermore, the present disclosure discloses, for the set of problems of reduced adhesion due to binder migration, a solution by the use of a thermoresponsive constituent contained in the paste to be coated. This constituent, for example methylcellulose, causes the coated moist paste to solidify under the action of thermal energy applied thereto. The solidification can at the same time reduce the migration of the SBR (styrene-butadiene-rubber) binder particles during the drying phase. Thereby it is ensured that the concentration of SBR binder particles at the interface between graphite coating and current collector foil is kept sufficiently high. In this manner, a higher adhesion is achieved. The reduced binder migration due to the use of a solidifying component may also allow for higher drying temperatures. Higher drying temperatures are usually avoided because they lead to a stronger binder migration and thus lower adhesion. Higher temperatures, however, enable an accelerated drying of the layer/coating and thus in this manner ensure a shortening of the drying duration or also a higher web speed. Both can lead to cost savings.

The mechanical processing of coated foils, such as for example graphite coatings on current collector foils, may possibly lead to stresses at the interface between the coating and film under certain circumstances. Especially in processes such as calendering and reeling of coated films, such as for example negative electrodes for the manufacture of rechargeable lithium-ion batteries, there can result delamination and formation of fractures in the coating (manufacture of so-called "jelly rolls" electrode coils).

The present disclosure discloses a solution to this problem by the controlled alignment of the graphite particles in relation to the processing or treatment direction, which is typically a direction parallel to the foil. In this way, for example, vertically aligned graphite particles align themselves by the operation of the appropriate magnetic tool on an angle of up to 60°, for example 45°, with respect to the processing or treatment direction of the moving article. This may then be particularly advantageous if the manufacture and following processing or treatment (for example, calendering or reeling up of the article) occur in the same direction, given that in this manner fractures during processing may be avoided.

For alignment of graphite particles along two directions, a strong changing magnetic field (for example, 0.4 Tesla), for example a rotating magnetic field, must be applied to the graphite paste. Therefore, according to the present disclosure, a magnetic field is applied by means of a magnetic tool directly to the preferably laminar or block-shaped article, in particular a graphite coating containing graphite particles, a binder and a constituent that is volatile on drying. A device corresponding to such a magnetic tool will be disclosed in following.

Magnetic fields with a flux density of over 100 mT are technically difficult to produce with electromagnets over large areas (10 cm$^2$ to 1 cm$^2$) and are easiest generated with permanent magnets, in particular with rare earth magnets. Therefore, the magnetic field of the magnetic tool is generated by one or a plurality of permanent magnets.

The magnetic tool according to the disclosure has a surface facing to the moving article. The movement of the article is tangential to this area. The surface of the magnetic tool may have various shapes, preferably planar, cylindrical, or curved.

Figure 6:
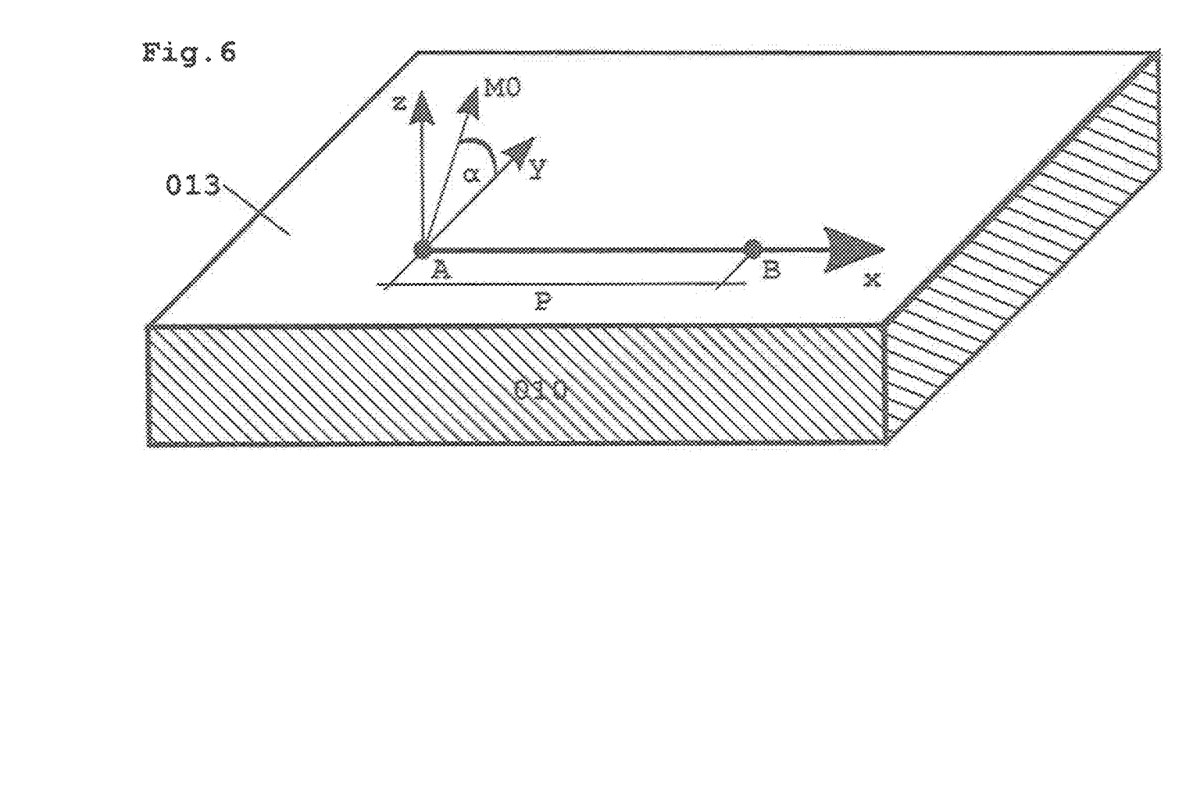
FIG. 6: magnetic tool with magnetic surface and magnetic orientation directions.

As shown in FIG. 6, on the surface of the magnetic tool three main directions are distinguished: the "magnetic variation direction (x)" goes along the surface of the magnetic tool, so that the magnetic field changes by a movement in this direction. Orthogonal to the magnetic variation direction (x) is depicted the "constant field direction (y)" along the surface of the magnetic tool, so that the magnetic field does not vary along this direction. The third direction is the normal (z) to the surface of the magnetic tool, this third direction (z) being orthogonal to both the magnetic change direction (x) and the constant field direction (y).

The following describes the alignment and the change of the magnetic field along the surface of the magnetic tool. As shown in FIG. 6, at a point A on the surface of the magnetic tool, the magnetic field vector has a component along the y-direction and the z-direction but no component along the x-direction. The direction of the magnetic field at this point A is described by the directional vector M0. The angle between M0 and the y-direction is the inclination angle of the magnetic field (alpha) and is between 0 degrees and 180 degrees.

As an example of a periodic field change, a rotation is described here. During a movement from point A along the magnetic change direction (x), the magnetic field vector first points in the M0 direction, then against the x-direction, then against the M0 direction, then in the x-direction and then to completion of a full rotation at point B back to the M0 direction. The distance between point A and point B is the "magnetic variation period (P)" and is 1 mm to 2 m, preferably 5 mm to 20 cm, particularly preferably 60 mm.

In order to generate in the article, particularly a graphite coating, a changing magnetic field, for example rotating or periodic, the graphite coating is moved relative to the surface of the magnetic tool. The distance between the object and the surface amounts to preferably 0-50 mm, particularly preferably 1-5 mm. It is for that matter possible, that the object and the surface be in contact, thus showing a separation distance of 0 mm.

Figure 8:
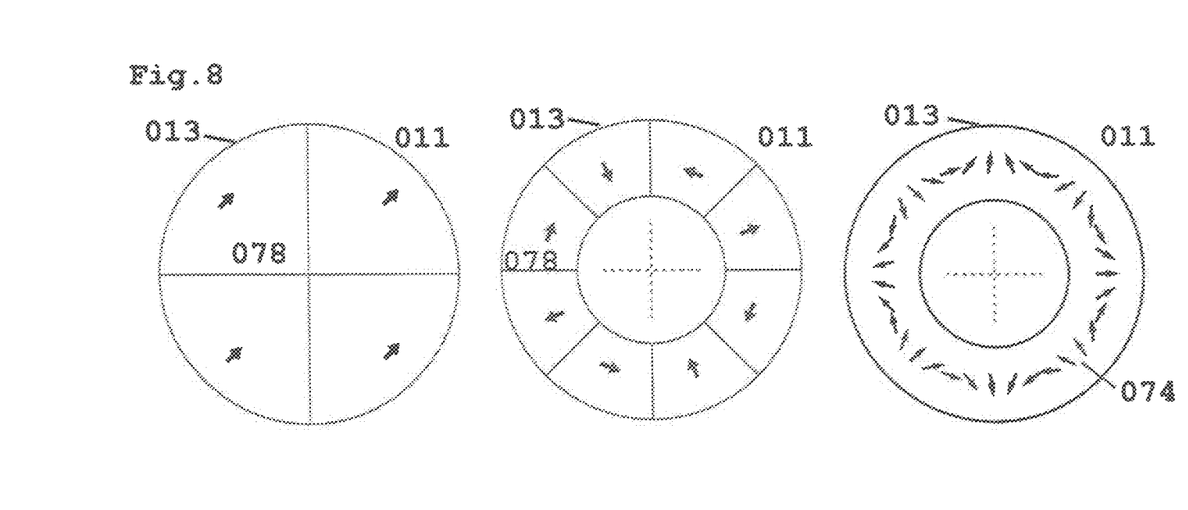
FIG. 8: examples of structure of a magnetic tool with cylindrical surface.

The relative movement between the article and the magnetic tool can be achieved with a planar tool surface through a displacement of the article, a displacement of the tool, or a combination of both these displacements. By a cylindrical tool surface, the relative movement, for example rotation or oscillation of the cylindrical tool surface, can be attained by rotating in the opposite (counter rotation) or rotating in the same (corotation) direction relative to the direction of movement of the article, as depicted in FIG. 8.

In the continuous production process of an article, especially a foil with graphite coating, the article is typically in a uniform motion. In order to control the alignment of the graphite particles relative to the direction of movement, the magnetic variation direction (x) of the magnetic tool is set relative to the direction of movement. For example, when the magnetic variation direction (x) of the magnetic tool is parallel to the direction of motion of the article, the graphite particles are aligned along the moving direction. In another example, the magnetic variation direction (x) of the magnetic tool may be set at an angle of 45 degrees to the direction of motion of the article, so that the graphite particles are aligned at an angle of 45 degrees to the direction of motion. The inclination angle of the particles relative to the surface of the article is given by the inclination angle (alpha) of the magnetic tool's magnetic field and can be controlled through this.

The realization of a magnetic tool that corresponds to the preceding description may also be attained approximately. Possible implementations of a magnetic tool that approximately corresponds to the preceding description are disclosed in following.

Figure 7:
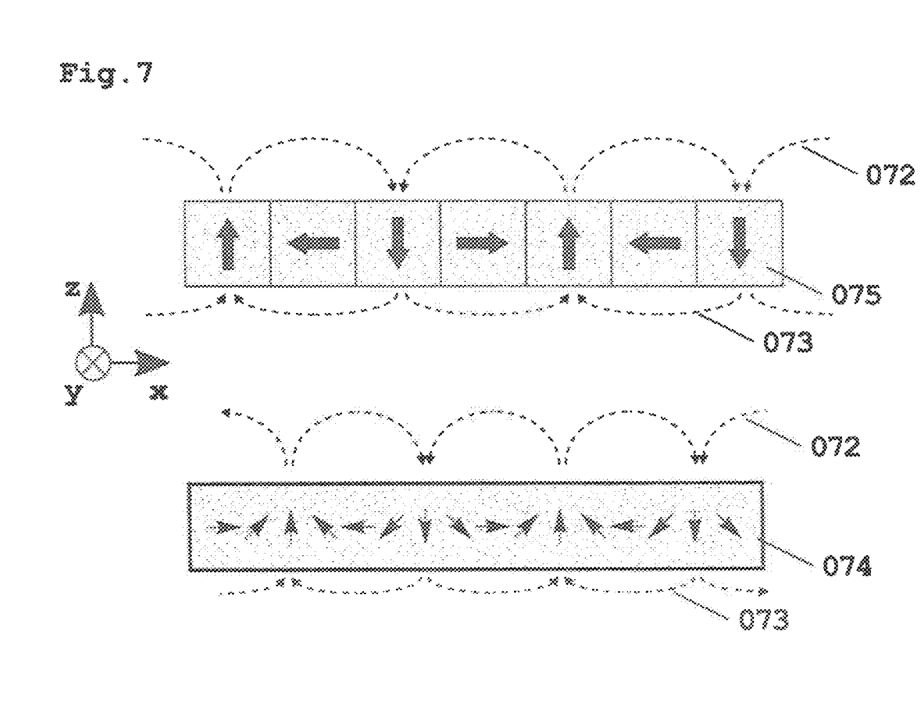
FIG. 7: examples of structure of a magnetic tool with planar surface.

A simple implementation of a single magnetic tool that corresponds to the preceding description is a Halbach array, FIG. 7. Here, a Halbach array is an arrangement of permanent magnets. The magnetization direction of the magnets in the x-direction of the magnetic tool changes stepwise. For example, in a Halbach array with a period of 4 magnets, the magnetic field orientation changes about 90° per magnet as shown in FIG. 7. Halbach arrays with more steps per period are possible. The inclination angle of the magnetic field in the Halbach array is typically 90 degree.

To achieve other angles of inclination between 0 and 180 degrees, preferably between 10 and 170 degrees, of the magnetic field in the magnetic tool, a Halbach-like array can be built. For this purpose, permanent magnets with a magnetization that is not orthogonal to one of the mechanical surfaces may be utilized. The inclination angle corresponds to the angle alpha in FIG. 6.

Figure 9:
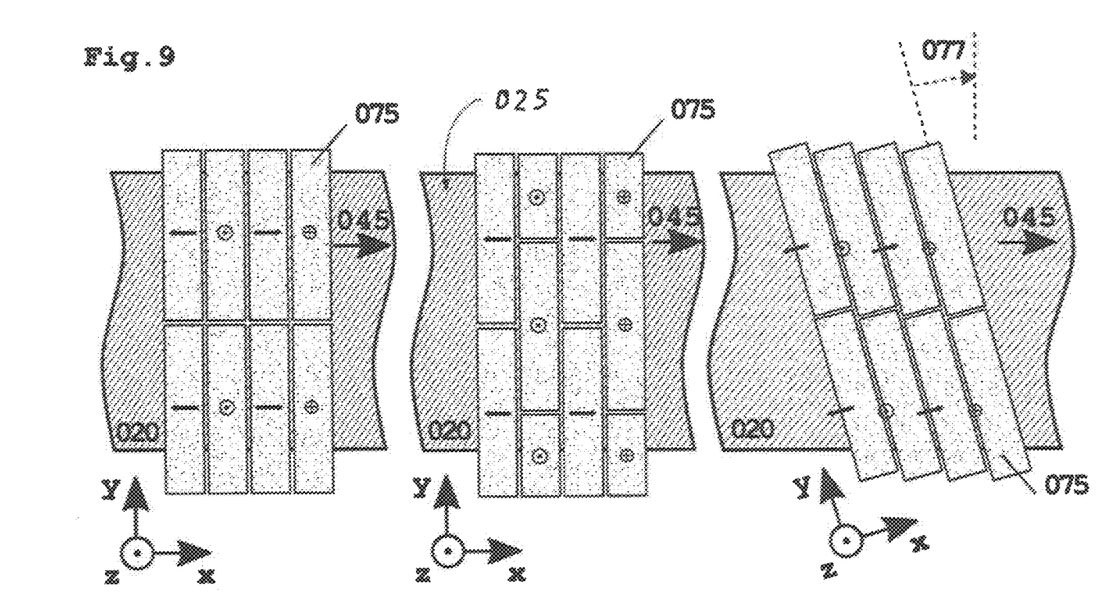
FIG. 9: embodiments of magnet arrangement according to the present disclosure.

For continuous manufacturing processes, it may be helpful to select the outer edges of the magnetic tool parallel to the direction of movement of the article, whereat the magnetic change direction (x) is not parallel to these directions. A possible realization of such a magnetic tool can be seen in FIG. 9 and is achieved by a Halbach-like configuration in which the permanent magnets are turned at an angle 077.

Another implementation may be a permanent magnet to which during its magnetization is imprinted a rotating magnetic field similar to the Halbach configuration along the x-direction (FIG. 7, down). In the magnetization of such a magnet, angles of inclination of the magnetic field between 0 and 180 degrees, preferably between 10 and 170 degrees, relative to the surface of the tool may be achieved.

Another implementation of a cylindrical magnetic tool may be a Halbach cylinder such as, for example, according to FIG. 8. Like a Halbach array, a Halbach cylinder can have multiple magnets per period, for example four like corresponding to FIG. 8 (middle). In the Halbach cylinder, the inclination angle of the magnetic field is 90°, and the magnetization variation direction (x) is orthogonal to the cylinder axis.

Another cylindrical magnetic tool may be constructed as a Halbach-like cylinder, wherein the magnetic field's inclination angle $\alpha$, the magnetic variation direction, and composition correspond to the Halbach-like array. Preferably, the circumference of each cylindrical magnetic tool is an integer multiple of the magnetic period length.

A magnetic tool of greater width along the y-direction can be obtained by apposition of several magnetic tools along their y-direction. Also, a magnetic tool can be extended along the x-direction by apposition of a plurality of magnetic tools along their x-direction. Likewise, a magnetic tool with higher magnetic flux density can be created by arranging two magnetic tools so that their surfaces face each other. This applies to all examples of magnetic tools set forth in following (this expandability is therefore not repeated with full details).

With an apposition of magnetic tools along the y-direction, separation distances between the tools may be necessary for the mechanical stabilization. These distances are preferably 0-10 mm, preferably 0-2 mm. These distances can lead to inhomogeneities in the magnetic field, which lead to inhomogeneities in the processed article, which in turn can lead to negative effects in the final product, for example a battery. To avoid these effects, these distances can be offset along the y-direction, so that they are distributed uniformly over the width of the magnetic tool, thereby achieving an approximately constant field along the y-direction.

Operative ranges of the method and tool according to the present disclosure:
  Roll diameter: 1 mm-10 m, 1 cm-1 m, 10 cm-50 cm
  Roll length: 1 cm-100 m, 10 cm-10 m, 1 m-5 m
  Wrap angle: 0°-360°, 15°-275°, 90°-180°, preferred 150°
  Foil thickness: 0.1 µm-10 cm, 1 µm-1 cm, 1 µm-1 mm
  Magnetic field strength: 1 µT-10 T, 10 mT-1 T, 100 mT-500 mT
  Magnetic field inclination angle: 0-180°, 45-135°, 70-110°
  Length of magnetic tool (x): 1 cm-100 m, 10 cm-10 m
  Width of magnetic tool (y): 1 cm-10 m, 30 cm-3 m
  Rotation speed: 1/µs-1/h, 1/ms-1/min, 10/s-0.1/s
  Foil speed: 1 mm/min-1000 m/min, 1 cm/min-100 m/min, 5 m/min-50 m/min

BRIEF DESCRIPTION OF THE DRAWINGS

Examples will be further described below in two embodiments with reference to drawings. The drawings show.

DETAILED DESCRIPTION

Example 1 (Coating with Halbach Array and without Thermoresponsive Constituent)

97 g of flake-shaped graphite are kneaded with 25 g of carboxymethylcellulose (CMC) solution (2% by weight) and 41 g of deionized water for 1 hour, and subsequently diluted by stirring with another 25 g of CMC Solution (2% by weight) and 30 g deionized water. Afterwards 5 g of a SBR latex (40% by weight) is introduced to this mixture and stirred for 2 minutes.

The so-obtained graphite paste is then applied with a doctor blade as a fluid film onto a current collector foil 025 (copper foil 15 μm), that was previously clamped between two rubber rollers that are not depicted. Subsequently, both of these rubber rollers are brought to rotation by means of an electric motor, so that the current collector foil 025 moves with the coating thereon, in the present example at a speed of 3 m/min, in the direction of movement 045 (see for example FIG. 1).

Thereupon, a magnetic tool having a magnetic surface 013 and in the form of a rigid, planar magnetic tool 010 comprising a package having a plurality of permanent magnets 075 (FIG. 7) in a Halbach array arrangement is directed to the article 020, in this example below the moving article 020.

A distance 071 is provided between the magnetic tool 010 and the article 020. The magnetic field of the tool 010 has a side with strong magnet field 072 and a side with weak magnet field 073. FIG. 7 furthermore shows a permanent magnet 074 with continuously changing magnetization. The strong magnetic field 072 is always preferably facing the article 020.

The magnetic field of the tool 010 acts on the moving, coated current collector foil 025, which in this example represents the moving article 020. The relative movement between the moving article 020 (the coated current collector foil 025) and the magnetic tool 010 generates a time-varying magnetic field in the article 020, which leads to the vertical alignment of the graphite particles.

Afterwards, hot air 030 is blown with hot air guns onto the current collector foil 025, which is moving together with the liquid graphite coating, and in this manner, the graphite coating is brought to dryness. By this, the volatile constituent (water) is removed, and the vertically aligned graphite particles are immobilized.

Example 2 (Coating with Halbach Array and Thermoresponsive Gelification)

97 g flake-shaped graphite is kneaded with 7.5 g of carboxymethylcellulose (CMC) solution (2% by weight), 23.3 g of a methylcellulose (MC) solution (1.5% by weight, thermoresponsive constituent) and 34.7 g deionized water for 1 h, and subsequently diluted by stirring with another 7.5 g of carboxymethylcellulose (CMC) solution (2% by weight), 23.3 g of a methylcellulose (MC) solution (1.5% by weight) and 10 g of deionized water.

Afterwards 5 g of a SBR latex (40% by weight) is introduced to this mixture and stirred for 2 minutes.

The so-obtained graphite paste is then coated with a doctor blade as a fluid film in a thickness of 200 μm on a current collector foil 025 (copper foil 15 μm) that was previously clamped between two rubber rollers that are not depicted. Subsequently, both of these two rubber rollers are brought to rotation by means of an electric motor, so that the current collector foil 025 moves with the coating thereon, in the present example at a speed of 3 m/min, in the direction of movement 045 (see for example FIG. 1).

Thereafter, a magnetic tool having a magnetic surface 013 and in the form of a rigid, planar magnetic tool 010 comprising a package having a plurality of permanent magnets 075 (FIG. 7) in the arrangement of a Halbach array is directed to the object 020, in this example below the moving, coated current collector foil 025. A distance 071 is provided between the magnetic tool 010 and the article 020. The magnetic field of the tool 010 has a side with strong magnet field 072 and a side with weak magnet field 073. FIGS. 7 and 8 furthermore show a permanent magnet 074 with continuously changing magnetization. The strong magnetic field 072 is always preferably facing the object 020.

The magnetic field of the tool 010 acts on the moving, coated current collector foil 025, which in this example also represents the moving article 020. The relative motion between the moving article 020 (the coated current collector foil 025) and the magnetic tool 010 creates a time-varying magnetic field in the article 020 which leads to the vertical alignment of the graphite particles.

Figure 1:
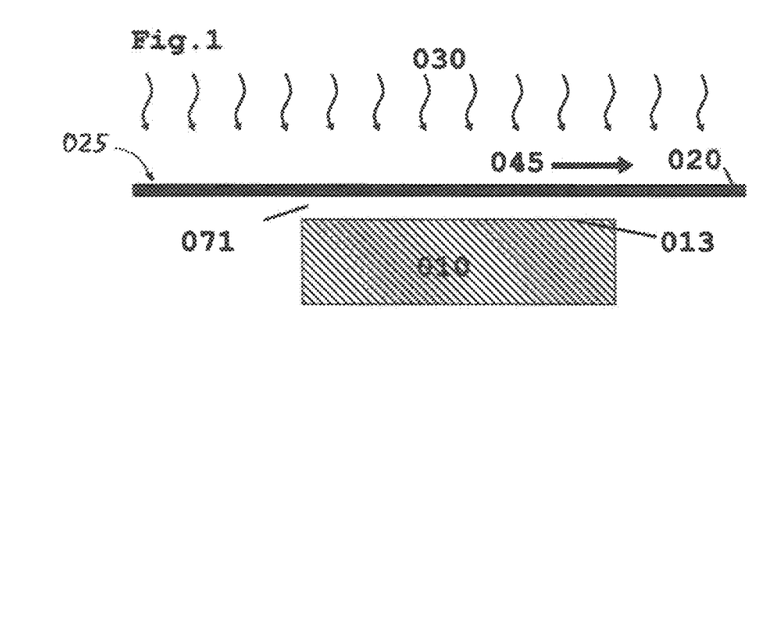
FIG. 1: general depiction for the method using a magnetic tool.
Figure 2:
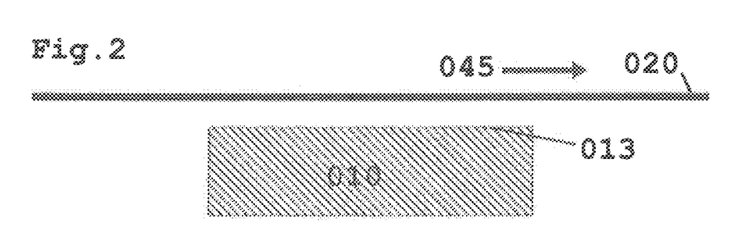
FIG. 2: method using a planar-surface magnetic tool according to the present disclosure.
Figure 3:
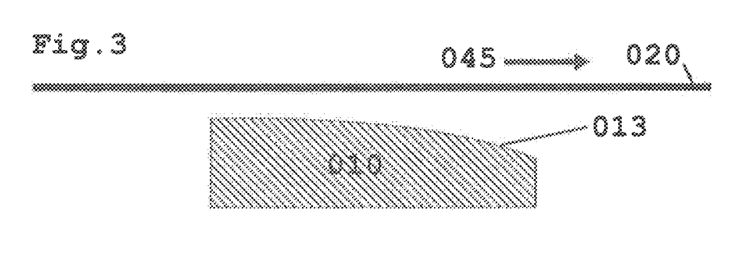
FIG. 3: method using a magnetic tool having curved surface.

In following, heat is applied to the moving coated current collector foil 025 by means of IR radiant heaters. The action of heat causes gelification of the coating. Thereafter, the magnetic tool 010 below the current collector foil 025 is removed and hot air 030 is blown with hot air guns onto the coating, and in this manner, the graphite coating is brought to dryness (FIG. 1).

Figure 4:
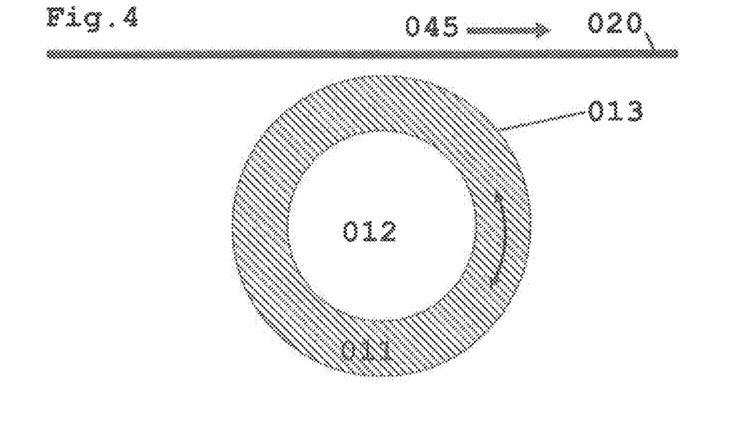
FIG. 4: method using a magnetic tool formed as a rotatable roller.
Figure 5:
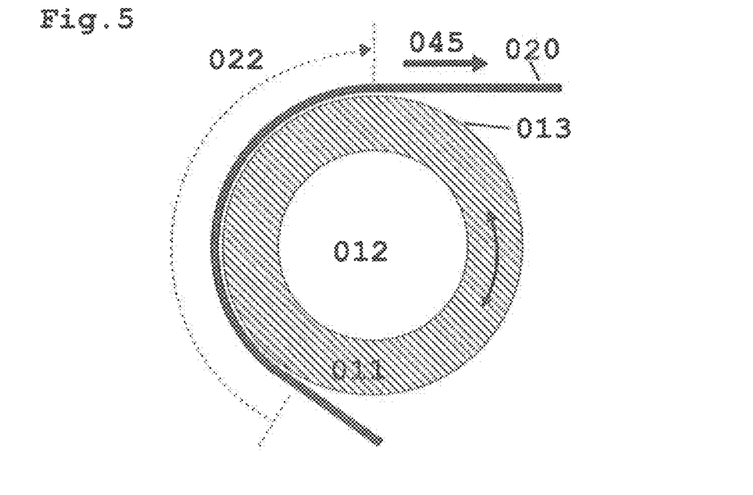
FIG. 5: method using a magnetic tool formed as a rotatable roller with wrapping of the article.

Examples with a cylindrical magnetic tool 011 are shown in FIGS. 4, 5, and 8. This tool 011 in turn has a magnetic surface 013 and a rotating roller 012. The article 020 wraps around the tool 011 with a defined wrapping angle 022 of, for example 160°.

The permanent magnets 075 may be formed as segments 078 and/or be arranged perpendicular to or at an angle 077 to the axis of rotation.

Figure 10:
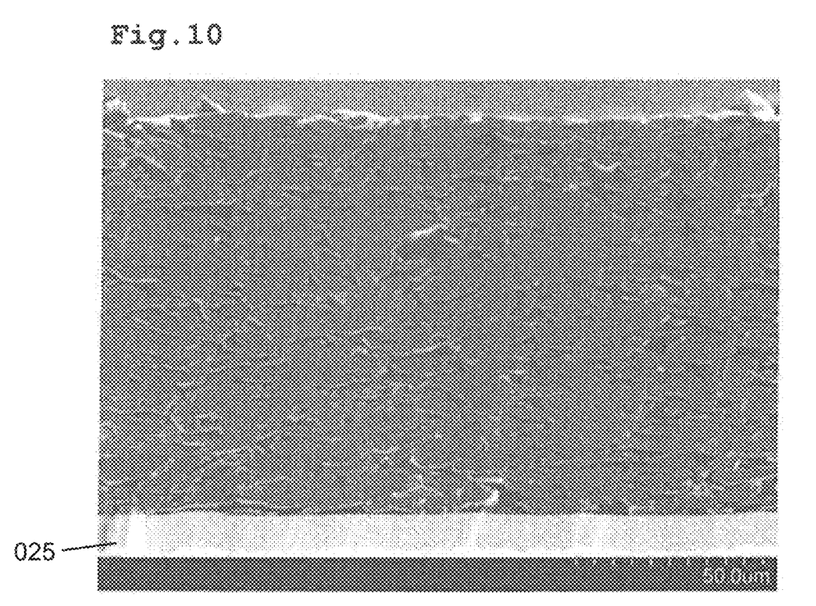
FIG. 10: a scanning electron microscope micrograph at cross-section of a graphite coating manufactured without the use of a changing magnetic field.

FIG. 10 shows a scanning electron microscope micrograph of a cross section of a graphite coating with flake-form graphite obtained without exposure to a magnetic field. The flaky graphite particles lie parallel to the underlying current collector foil 025.

Figure 11:
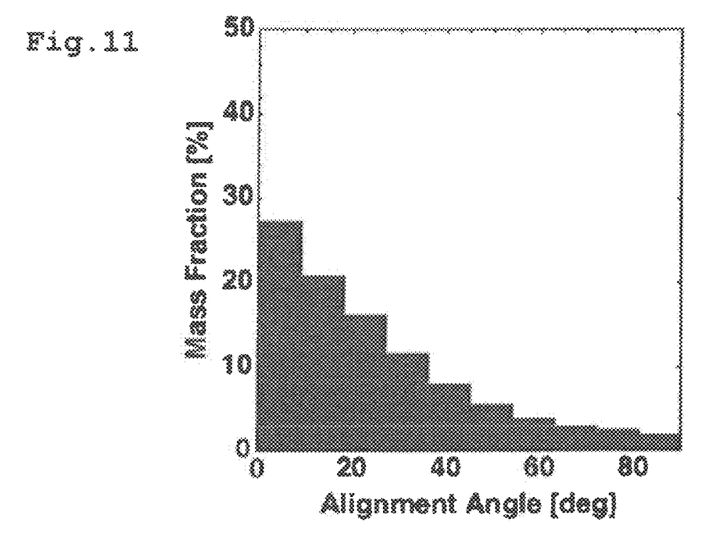
FIG. 11: a histogram of the orientation of layer planes in the cross-section of graphite coating manufactured without the application of a changing magnetic field.

FIG. 11 shows a histogram of the alignment distribution of the graphite particles in a graphite coating obtained without the action of a magnetic field.

Figure 13:
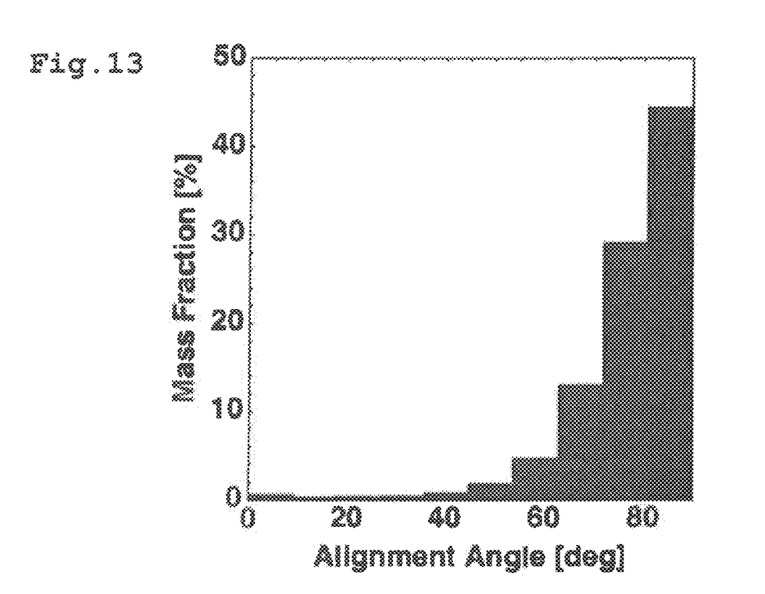
FIG. 13: a histogram of the orientation of layer planes in the cross-section of graphite coating manufactured with the application of a changing magnetic field.

FIG. 13 shows a histogram of the alignment distribution of the graphite particles in a graphite coating obtained by the example-described method in a magnetic field. The flaky graphite particles in their majority lie vertically (at 90° angle) to the underlying copper foil, the current collector foil 025.

Figure 12:
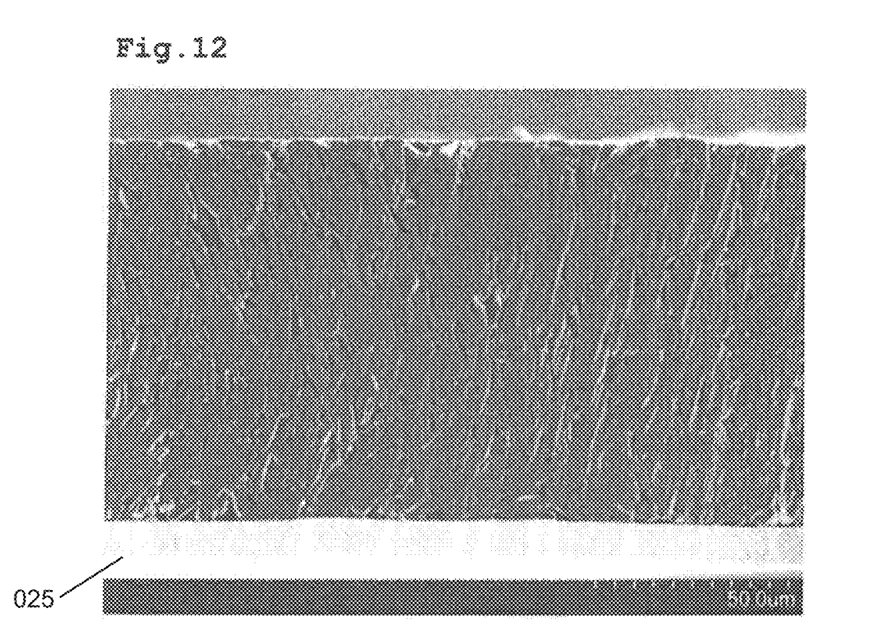
FIG. 12: a scanning electron microscope micrograph at cross-section of a graphite coating manufactured based on a changing magnetic field.

A scanning electron microscope micrograph of a cross section of the obtained graphite coating of the example shows the vertical alignment of the flake-shaped graphite particles in FIG. 12. Depicted is a scanning electron micrograph of a cross section of an aligned graphite coating with flake-form graphite obtained in a magnetic field by a method described in the examples.

The flaky graphite particles in their majority stand vertical (at 90° angle) to the underlying copper foil, the current collector foil 025.

The analysis of the coating by means of an X-ray diffraction instrument (Rigaku Smart Lab®) shows in FIG. 11 a significantly increased amount of graphite particles whose (110)-plane, the plane which is parallel to the graphene sheets of the graphite particles, are aligned vertically, that is 90°, to the current collector foil 025, in comparison to a graphite coating which is not exposed to a rotating magnetic field (FIG. 13).

The obtained graphite coating with the vertically aligned flake-shaped particles contained therein is subsequently calendered to a porosity of 30%.

Further subsequent analysis of the compressed graphite coating by means of an X-ray diffraction instrument (Rigaku Smart Lab®) yields a furthermore, significantly increased intensity for graphite particles whose (110)-plane, that is the plane which is parallel to the graphene layers of the graphite particles, is aligned vertically to the current collector foil 025.

LIST OF REFERENCE LABELS

010 magnetic tool
011 cylindrical magnetic tool
012 (fixed) center, around which a rotatable cylinder moves
013 magnetic surface of the magnetic tool
020 moved article upon which the magnetic field acts
022 contact arc/wrap angle
025 current collecting foil
030 External effect, for example warm air, light radiation, X-radiation/X-rays
045 direction of movement of article
071 separation distance between magnetic tool and article
072 strong magnetic field
073 weak magnetic field
074 permanent magnet with continuously varying magnetization
075 permanent magnet
077 angle
078 permanent magnetic segment

What is claimed is:

1. A method for producing an electrode for a lithium-ion battery, the method comprising the steps of:
    coating a homogeneous layer of a slurry mixture including flake graphite particles, deionized water as volatile liquid, a binder mix that includes carboxymethylcellulose and styrene-butadiene rubber (SBR) latex binder, and a thermoresponsive constituent that has mass fraction in the range of 0.1% to 0.4% by weight over a metallic surface of a current collector foil to produce coated current collector foil;
    transporting the coated current collector foil as transported, coated current collector foil on a production path;
    subjecting the transported, coated current collector foil to a continuously applied time-varying magnetic field to produce, in the layer of slurry mixture, controlled alignment of the Hake graphite particles on their vertical axes; and
    continuing to subject the transported, coated current collector foil to a magnetic field to maintain alignment of the flake graphite particles while simultaneously heating the transported, coated current collector foil to induce solidification and drying of the layer of slurry mixture to (a) preserve the alignment of the flake graphite particles and (b) prevent SBR latex binder migration.

2. The method for producing an electrode for a lithium-ion battery as claimed in claim 1, wherein:
    said step of subjecting the transported, coated current collector foil to a continuously applied time-varying magnetic field to produce, in the layer of slurry mixture, controlled alignment of the flake graphite particles on their vertical axes utilizes magnetic field flux density in the range of 0.1 to 0.5 T.

3. The method for producing an electrode for a lithium-ion battery as claimed in claim 1, wherein:
    said step of coating a homogeneous layer of a slurry mixture including flake graphite particles, deionized water as volatile liquid, a binder mix that includes carboxymethylcellulose and SBR latex binder, and a thermoresponsive constituent that has mass fraction in the range of 0.1% to 0.4% by weight over a metallic surface of a current collector foil to produce coated current collector foil utilizes a thermoresponsive constituent including at least one of either substituted or unsubstituted anhydroglucose rings.

4. The method for producing an electrode for a lithium-ion battery as claimed in claim 1, wherein:
    said step of coating a homogeneous layer of a slurry mixture including flake graphite particles, deionized water as volatile liquid, a binder mix that includes carboxymethylcellulose and SBR latex binder, and a thermoresponsive constituent that has mass fraction in the range of 0.1% to 0.4% by weight over a metallic surface of a current collector foil to produce coated current collector foil employs at least one thermoresponsive constituent selected from the group of thermoresponsive constituents consisting of methylcellulose, hydroxypropylcellulose, and Poly(N-Isopropylacrylamide).

5. The method for producing an electrode for a lithium-ion battery as claimed in claim 1, wherein:
    said step of coating a homogeneous layer of a slurry mixture including flake graphite particles, deionized water as volatile liquid, a binder mix that includes carboxymethylcellulose and SBR latex binder, and a thermoresponsive constituent that has mass fraction in the range of 0.1% to 0.4% by weight over a metallic surface of a current collector foil to produce coated current collector foil provides the homogeneous layer as a layer exhibiting a Lower Critical Solution Temperature (LCST) in the range of 30° C. to 60° C.

6. The method for producing an electrode for a lithium-ion battery as claimed in claim 1, wherein:
    said step of continuing to subject the transported, coated current collector foil to a magnetic field to maintain alignment of the flake graphite particles while simultaneously heating the transported, coated current collector foil to induce solidification and drying of the layer of slurry mixture to (a) preserve the alignment of the flake graphite particles and (b) prevent SBR latex binder migration removes less than 50% of the volatile liquid water.

7. The method for producing an electrode for a lithium-ion battery as claimed in claim 6, wherein:
    said step of continuing to subject the transported, coated current collector foil to a magnetic field to maintain alignment of the flake graphite particles while simultaneously heating the transported, coated current collector foil to induce solidification and drying of the layer of slurry mixture to (a) preserve the alignment of the flake graphite particles and (b) prevent SBR latex binder migration removes less than 10% of the volatile liquid water.

8. The method for producing an electrode for a lithium-ion battery as claimed in claim 1, wherein:

said step of subjecting the transported, coated current collector foil to a continuously applied time-varying magnetic field to produce, in the layer of slurry mixture, controlled alignment of the flake graphite particles on their vertical axes includes subjecting the transported, coated current collector foil to a rotating magnetic field.

9. The method for producing an electrode for a lithium-ion battery as claimed in claim 1, wherein:

said step of subjecting the transported, coated current collector foil to a continuously applied time-varying magnetic field to produce, in the layer of slurry mixture, controlled alignment of the flake graphite particles on their vertical axes includes moving the current collector foil in a direction parallel to a tangent to a surface of a magnetic tool.

10. The method for producing an electrode for a lithium-ion battery as claimed in claim 1, wherein:

said step of continuing to subject the transported, coated current collector foil to a magnetic field to maintain alignment of the flake graphite particles while simultaneously heating the transported, coated current collector foil to induce solidification and drying of the layer of slurry mixture to (a) preserve the alignment of the flake graphite particles and (b) prevent SBR latex binder migration includes heating with IR-heaters.

* * * * *

UNITED STATES PATENT AND TRADEMARK OFFICE
CERTIFICATE OF CORRECTION

PATENT NO. : 11,189,824 B2
APPLICATION NO. : 16/327116
DATED : November 30, 2021
INVENTOR(S) : Martin Ebner et al.

Page 1 of 1

It is certified that error appears in the above-identified patent and that said Letters Patent is hereby corrected as shown below:

In the Claims

Column 11, Line 56, in Claim 1, replace "Hake" with -- flake --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*